Patented Dec. 31, 1946

2,413,570

UNITED STATES PATENT OFFICE 2,413,570

POLYVINYL ALCOHOL COMPOSITION

Charles J. Krister, Wilmington, Del., and Henry J. Sedusky and George L. Thompson, Cleveland, Ohio, assignors to E. I. du Pont de Nemours & Company, Wilmington, Del., a corporation of Delaware No Drawing. Application June 18, 1943, Serial No. 491,394

7 Claims. (Cl. 260—32)

This invention relates to compositions comprising polyvinyl alcohol and a clay cooperative therewith and to processes and articles employing such compositions as adhesives, and is more particularly directed to adhesive and film-forming compositions comprising polyvinyl alcohol and a clay of the type of Chicora No. 3, to methods for producing water-resistant joined structures comprising adhesively uniting two or more component parts with polyvinyl alcohol-reactive clay compositions, and to the water-resistant structures so produced.

It has already been proposed to use solutions of polyvinyl alcohol for various adhesive purposes. However, for many purposes polyvinyl alcohol alone sets much too slowly to be of any important commercial value. Furthermore, the adhesive films from a dried-down polyvinyl alcohol solution are so lacking in water resistance that the suitability of structures joined with the polyvinyl alcohol adhesives is severely restricted for most purposes. Various methods have been proposed for improving the water resistance of such adhesive films, but most of these methods require the use of agents which are relatively expensive or heat treatments which complicate and increase the cost of the operation. Also, the addition agents heretofore suggested tend to make polyvinyl alcohol adhesive solutions unstable and to alter their physical properties and make them less desirable for use in such operations as the manufacture of laminated fibreboard, where the physical properties of the adhesive are critical in the operation of the commercial pasting machines used.

It is an object of this invention to provide polyvinyl alcohol adhesive compositions which set up rapidly after application as adhesives. Another object is to provide polyvinyl alcohol adhesives which dry down from water dispersion to water-resistant adhesive films. Another object is to provide water-resistant adhesives based on polyvinyl alcohol which give water-resistant adhesive films without the use of expensive insolubilizing agents. Another object is to provide water-resistant structures adhesively joined with adhesives based on polyvinyl alcohol. Other objects will appear hereinafter.

The foregoing and related objects of this invention are accomplished by adhesive compositions comprising polyvinyl alcohol and a clay cooperative with the polyvinyl alcohol, particularly of the type of Chicora No. 3, by processes for producing water-resistant joined structures in which two or more components are united through a medium of a dried-down polyvinyl alcohol-reactive clay film, and by the water-resistant structures so produced.

The processes and compositions of this invention are applicable in any use where two or more objects are to be adhesively joined. The compositions are particularly well-suited for use in the laminated board industry, for instance, in the manufacture of corrugated and solid fibreboard. The compositions have physical properties ideally suited for use in modern corrugated board or solid fibreboard pasting machines, the adhesive setting up more rapidly than the adhesives heretofore customarily used on such machines. The laminated fibreboard produced is unusually water-resistant, meeting all requirements of waterproofness for such board.

The polyvinyl alcohol used in a composition of this invention suitably may be prepared by hydrolyzing a polyvinyl acetate solution and hence may contain some residual polyvinyl acetate. Preferably, the amount of such polyvinyl acetate should be relatively low. The degree of polymerization of the alcohol should be such as to give a viscosity in the solution of from about 1200 to 2200 centipoises measured at a concentration of 8 to 12%, viscosities in the upper portion of this range being particularly preferred.

The clay used in a composition of this invention should be one which is cooperative with the polyvinyl alcohol to give a water-insoluble product when an aqueous dispersion of the clay and alcohol is dried down. It is particularly preferred to use a clay having physical and chemical characteristics substantially identical with those of a clay known as "Chicora No. 3," which is a South Carolina cretaceous sedimentary kaolin having the following characteristics:

| Chemical analysis | | Particle size distribution | |
|---|---|---|---|
| Ingredients [1] | Per cent | Micron diameter | Per cent |
| Combined water | 13.71 | Above 10 microns | 0.3 |
| Silica | 45.28 | 5–10 | 4.2 |
| Alumina | 37.15 | 4–5 | 1.9 |
| Iron oxide | 0.84 | 3–4 | 2.8 |
| Titanium oxide | 0.75 | 2–3 | 3.9 |
| Sodium oxide | 0.45 | 1–2 | 6.9 |
| Potassium oxide | 0.25 | 0.5–1 | 10.5 |
| Phosphorus pentoxide | 1.57 | 0–0.5 | 69.5 |
| pH | 4.9 | | |

[1] Present in combined form, calculated as indicated.

To make an adhesive of this invention one part by weight of polyvinyl alcohol, on the dry basis, is mixed with from about ½ to 4 parts of clay. For use in the manufacture of corrugated board or laminated fibreboard, it is preferred to use a mixture of about 1 part of polyvinyl alcohol to from 1 to 3 parts of clay, a mixture of 40% polyvinyl alcohol and 60% clay being especially preferred. It is preferred to supply the adhesive to the trade in the form of a dry mixture of alcohol and clay since the cost of transportation of the dry adhesive is materially less, there is no problem of stability of the mixture during storage, and an adhesive solution may be made up by the user in any concentration adapted to his particular needs. It is a unique characteristic of the dry polyvinyl alcohol-clay mixtures of this invention that they are more readily dispersed in water than are the separate components.

To make an adhesive solution from the dry mixture of polyvinyl alcohol and clay, the mixture is cooked up with water to the desired concentration. This may suitably be done, for instance, by slurrying the solids in cold water and heating the mixture to about 80° C. for ½ to 1 hour. The adhesive may then be cooled approximately to room temperature before use.

The concentration of solids in the adhesive solution will depend in any particular instance on the use to which the adhesive is to be applied, but, in general, the solids content preferably may be about from 10 to 25%. For use as a laminating adhesive in making corrugated or solid fibreboard, a solids content of about 20% is preferred and at this concentration it is especially preferred to use a polyvinyl alcohol which with the clay used gives a viscosity in the range of about from 1200 to 2200 centipoises in the liquid adhesive. A polyvinyl alcohol giving a viscosity near the upper end of this range is particularly effective.

The prepared adhesive solution of this invention is a smooth, viscous liquid with considerable tack. It is easy to handle and exhibits a remarkable degree of stability. The material shows no deterioration over considerable periods of time. As used on modern pasting machines the mixture shows a high tack without excessive stringiness or "webbing" effects. In this respect, the mixture of clay and polyvinyl alcohol is superior to the polyvinyl alcohol alone.

In using a polyvinyl alcohol-reactive clay water dispersion as an adhesive according to this invention, the aqueous dispersion is applied as a film to one of the surfaces to be united and the second surface is superimposed on the film and held in place while water is removed. The manner of removing water may be any method adapted to the particular situation. For instance, in laminated paper-board water is instantaneously removed by diffusion into the paperboard members which are being joined, followed by evaporation therefrom, the adhesive setting immediately. It will be understood that various methods may be used to augment the rate of water removal, such as applying heat or suspending unswelled starch in the polyvinyl alcohol-clay dispersion, the unswelled starch taking up a considerable amount of water upon the application of heat in the paper pasting machine.

Agents designed to promote the setting up of the polyvinyl alcohol-clay mixture may be applied to the surfaces to be joined. For instance, when using the adhesive in laminated fibreboard, the laminations may be highly sized with rosin-alum size or with any other polyvinyl alcohol-insolubilizing agents, of which dimethylol urea and trimethylol melamine are representative.

In using an aqueous polyvinyl alcohol-clay dispersion of this invention for producing laminated fibreboard, the dispersion suitably may be applied at the rate of about from 1 to 6 lbs. per thousand square feet of glue line. Larger amounts may be used under particular circumstances, but ordinarily will not be found necessary or desirable. Smaller amounts, while suitable under special circumstances, are ordinarily inadequate to give a bond of maximum strength.

The finished adhesively-joined structures of this invention are characterized by their remarkable resistance to water. A solid fibreboard made up of laminations joined with a polyvinyl alcohol-clay adhesive of this invention will withstand prolonged soaking in water without showing ply separation. As measured on a standard Mullen testing machine, the wet bursting strength of such board is remarkably higher than with board made using polyvinyl alcohol alone as the adhesive.

The invention will be better understood by reference to the following illustrative examples:

*Example 1*

This example describes the application of an adhesive of this invention to the preparation of solid fibre boxboard.

One hundred pounds of a dry mixture of 40% polyvinyl alcohol and 60% Chicora No. 3 clay was slurried with a mechanical mixer into 360 lbs. of cold water to form a homogeneous mixture. Live steam was introduced and the temperature raised to 170–180° F. and maintained at that temperature with stirring for ½ hour. About 40 lbs. of steam condensed into the mixture to give a final mixture containing 20% solids.

After cooling to room temperature, this adhesive was used directly for the preparation of four-ply solid fibre boxboard on a commercial sealing machine. The paper used was highly alum-rosin sized Kraft, 0.024–0.026" thick, 92–94 lbs. per thousand square feet, 64" wide.

Excellent board was made from the start of the machine. There was no separation of the ply and immediate bonding was evident. The machine was operating at a speed of 170–200 feet per minute and the adhesive was applied at the rate of approximately 4–6 lbs. per thousand square feet of glue line.

The prepared board was highly water-resistant. There was no ply separation upon immersion in water after a period of several months.

*Example 2*

The following example illustrates the application of an adhesive of this invention to the production of corrugated board.

A dry mixture of 30% polyvinyl alcohol and 70% Chicora No. 3 clay is used after cooking in water at a solids content of about 25%.

In preparing the liquid adhesive 100 lbs. of dry adhesive is slurried with 370 lbs. of cold water by means of a mechanical stirrer. When a homogeneous mixture is obtained, live steam is introduced to raise the temperature to 170–180° F. This temperature is maintained for ½ hour with stirring and the adhesive cooled for use. The live steam will condense sufficient water into the mixture to bring the solids content to approximately 25%.

The adhesive is found to have a satisfactory setting time for operation upon a corrugated board machine. The adhesive is waterproof, as evident from the fact that double face board shows no ply separation upon immersion in water after a period of over a month. The adhesive prepares particularly satisfactory board when used with water-resistant, highly alum-rosin sized paper. Under these conditions the corrugated board shows considerable strength at the glue line after immersion in water for several days.

While in the foregoing description of this invention certain specific embodiments have been shown, it will be understood that without departing from the scope of the invention those skilled in the art may produce various adhesive compositions and adhesively joined structures and may employ various processes using such adhesives.

We claim:

1. A dry composition adapted to be dispersed in water, comprising one part by weight of polyvinyl alcohol on the dry basis and from ½ to 4 parts of a clay substantially identical with Chicora No. 3.

2. An adhesive and film-forming composition, comprising an aqueous solution of polyvinyl alcohol containing a clay substantially identical with Chicora No. 3, the clay being present in an amount from ½ to 4 times the weight of the polyvinyl alcohol and the total solids content, due to clay and polyvinyl alcohol, being about from 5 to 25%.

3. A dry composition adapted to be dispersed in water, comprising one part by weight, on the dry basis, of polyvinyl alcohol and from ½ to 4 parts of a clay substantially identical with Chicora No. 3, the mixture having a viscosity, when dispersed in water to give a 20% solids content, of about from 1200 to 2200 centipoises.

4. A dry composition adapted to be dispersed in water, comprising 40% by weight, on the dry basis, of polyvinyl alcohol and 60% by weight of a clay substantially identical with Chicora No. 3, the mixture having a viscosity, when dispersed in water to give a 20% solids content, of about from 1200 to 2200 centipoises.

5. An adhesive and film-forming composition, comprising an aqueous solution of polyvinyl alcohol, the solution containing a clay substantially identical with Chicora No. 3 in an amount 1½ times the dry weight of polyvinyl alcohol, the total solids content, due to polyvinyl alcohol and clay, being about 20%, and the clay-containing solution having a viscosity of about from 1200 to 2200 centipoises.

6. A dry composition adapted to be dispersed in water, comprising one part by weight, on the dry basis, of polyvinyl alcohol and from ½ to 4 parts of a kaolinite-type clay, the mixture having a viscosity of about from 1200 to 2200 centipoises when dispersed in water to give a 20% solids content.

7. An adhesive and film-forming composition, comprising an aqueous solution of polyvinyl alcohol containing a kaolinite-type clay, the clay being present in an amount from ½ to 4 times the weight of the polyvinyl alcohol and the total solids content, due to clay and polyvinyl alcohol, being about from 5 to 25%.

CHARLES J. KRISTER.
HENRY J. SEDUSKY.
GEORGE L. THOMPSON.